United States Patent
Miller et al.

(10) Patent No.: US 11,845,316 B1
(45) Date of Patent: Dec. 19, 2023

(54) ADJUSTABLE PIVOT JOINT FOR VEHICLE SUSPENSIONS

(71) Applicant: Northstar Manufacturing Co., Inc., Minnetonka, MN (US)

(72) Inventors: Shawn Miller, Milaca, MN (US); Kurt Vinje, Chanhassen, MN (US); James Ryshavy, West Palm Beach, FL (US)

(73) Assignee: NORTHSTAR MANUFACTURING CO., INC., Minnetonka, MN (US)

( * ) Notice: Subject to any disclaimer, the term of this patent is extended or adjusted under 35 U.S.C. 154(b) by 0 days.

(21) Appl. No.: 17/940,167

(22) Filed: Sep. 8, 2022

Related U.S. Application Data

(60) Provisional application No. 63/241,807, filed on Sep. 8, 2021.

(51) Int. Cl.
    *B60G 7/00*     (2006.01)
    *B60G 3/26*     (2006.01)

(52) U.S. Cl.
    CPC ............... *B60G 7/005* (2013.01); *B60G 3/26* (2013.01); *B60G 2200/144* (2013.01); *B60G 2200/46* (2013.01); *B60G 2200/464* (2013.01); *B60G 2204/416* (2013.01)

(58) Field of Classification Search
    CPC .... B60G 7/005; B60G 3/26; B60G 2200/144; B60G 2200/46; B60G 2200/464; B60G 2204/416; F16C 11/06; F16C 11/0695
See application file for complete search history.

(56) References Cited

U.S. PATENT DOCUMENTS

| | | | |
|---|---|---|---|
| 844,421 | A | 2/1907 | Stafford |
| 1,646,288 | A | 10/1927 | Graham |
| 2,977,131 | A | 3/1961 | Moskovitz et al. |
| 3,061,344 | A | 10/1962 | Gray et al. |
| 3,104,117 | A | 9/1963 | Pierce |
| 3,127,192 | A | 3/1964 | Traugott et al. |
| 3,817,549 | A | 6/1974 | Bohannon et al. |
| 4,003,666 | A | 1/1977 | Gaines et al. |
| 4,162,859 | A | 7/1979 | McAfee |
| 4,430,016 | A | 2/1984 | Matsuoka et al. |
| 4,482,266 | A | 11/1984 | Kaneko |
| 4,541,162 | A | 9/1985 | Halvin |
| 4,613,250 | A | 9/1986 | Laucus |
| 4,768,895 | A | 9/1988 | Ludwig et al. |

(Continued)

FOREIGN PATENT DOCUMENTS

| | | |
|---|---|---|
| EP | 1598260 | 11/2005 |
| KR | 199800387 | 9/1998 |

(Continued)

*Primary Examiner* — Jason D Shanske
*Assistant Examiner* — Matthew James O'Neill
(74) *Attorney, Agent, or Firm* — Billion & Armitage

(57) ABSTRACT

A pivot joint for connection between first and second suspension members in a vehicle suspension permits adjustment of wheel alignment characteristics without removal or disassembly of the pivot joint. Wheel alignment adjustment may be accomplished with mutual rotation of engaged components of the pivot joint, wherein engaged guide structures of the pivot joint component convert the mutual rotation to translational movement of one pivot joint component relative to the other pivot joint component. The translational movement may be oriented to selectively adjust wheel alignment characteristics.

19 Claims, 17 Drawing Sheets

(56) References Cited

U.S. PATENT DOCUMENTS

| | | | |
|---|---|---|---|
| 4,776,720 A | 10/1988 | Nolen | |
| 4,921,271 A | 5/1990 | Berry et al. | |
| 5,052,711 A | 10/1991 | Pirkey | |
| 5,080,388 A | 1/1992 | Berry et al. | |
| 5,931,485 A | 8/1999 | Modinger | |
| 6,042,294 A | 3/2000 | Urbach | |
| 6,047,789 A | 4/2000 | Iwanaga | |
| 6,224,075 B1 * | 5/2001 | McIntyre | B62D 17/00 280/86.756 |
| 6,257,601 B1 | 7/2001 | Spears | |
| 6,293,724 B1 | 9/2001 | Spears et al. | |
| 6,382,645 B1 | 5/2002 | Gravelle | |
| 6,409,189 B1 | 6/2002 | Orimoto et al. | |
| 6,446,991 B1 | 9/2002 | Klais | |
| 6,457,728 B1 | 10/2002 | Klais | |
| 6,478,318 B1 | 11/2002 | Allman et al. | |
| 6,557,872 B1 * | 5/2003 | Garrard | B60G 3/265 280/86.754 |
| 6,676,142 B2 | 1/2004 | Allman et al. | |
| 6,688,616 B1 | 2/2004 | Ziech | |
| 6,783,136 B2 | 8/2004 | Pronsias Timoney et al. | |
| 6,851,687 B2 | 2/2005 | Klais | |
| 7,111,855 B2 | 9/2006 | Winkler et al. | |
| 7,370,868 B2 | 5/2008 | Genick, II | |
| 7,481,535 B2 | 1/2009 | Urbach | |
| 7,481,595 B2 | 1/2009 | Urbach | |
| 7,513,514 B1 * | 4/2009 | Schlosser | B62D 17/00 280/86.756 |
| 7,537,225 B2 | 5/2009 | Ryshavy | |
| 7,568,711 B2 | 8/2009 | Houser | |
| 7,618,047 B2 | 11/2009 | Kirby | |
| 7,661,916 B2 | 2/2010 | Downey | |
| 7,699,327 B2 | 4/2010 | Halfmann et al. | |
| 7,857,332 B2 | 12/2010 | Hsu | |
| 7,891,679 B2 | 2/2011 | Svartz et al. | |
| 8,042,817 B2 | 10/2011 | Montebennur et al. | |
| 8,052,345 B2 | 11/2011 | Byers et al. | |
| 8,075,005 B1 | 12/2011 | Ryshavy | |
| 8,297,902 B2 | 10/2012 | Schraer | |
| 8,469,371 B1 | 6/2013 | Lee et al. | |
| 8,544,861 B2 | 10/2013 | Frens | |
| 8,746,714 B2 | 6/2014 | Frens | |
| 8,757,648 B1 | 6/2014 | Winter | |
| 9,233,589 B1 | 1/2016 | Miller | |
| 9,254,724 B2 | 2/2016 | Corby | |
| 9,409,598 B2 | 8/2016 | Giorgi et al. | |
| 9,476,447 B2 | 10/2016 | Schmidt et al. | |
| 9,643,645 B2 | 5/2017 | Dendis et al. | |
| 9,982,711 B1 | 5/2018 | Henriksen | |
| 10,308,089 B2 | 1/2019 | Elterman | |
| 10,994,580 B1 | 4/2021 | Ryshavy | |
| 11,254,176 B1 | 2/2022 | Ryshavy | |
| 2002/0152867 A1 | 10/2002 | Meredith | |
| 2004/0090003 A1 | 5/2004 | Genick | |
| 2004/0206202 A1 | 10/2004 | Hultquist | |
| 2005/0067803 A1 | 3/2005 | Inayoshi et al. | |
| 2005/0242539 A1 | 11/2005 | Matthew | |
| 2007/0001416 A1 | 1/2007 | Freytag | |
| 2007/0102894 A1 | 5/2007 | Derisi | |
| 2007/0111808 A1 | 5/2007 | Izquierdo | |
| 2008/0284165 A1 | 11/2008 | Chiang | |
| 2011/0153157 A1 | 6/2011 | Klank | |
| 2013/0183080 A1 | 7/2013 | Nachbar | |
| 2019/0001773 A1 | 1/2019 | Kwon et al. | |
| 2019/0071121 A1 | 3/2019 | Wilhelm | |
| 2019/0152283 A1 | 5/2019 | Kwin | |
| 2021/0372463 A1 | 12/2021 | Miller | |

FOREIGN PATENT DOCUMENTS

| | | |
|---|---|---|
| KR | 20040000174 | 1/2004 |
| WO | 2005076956 | 8/2005 |

* cited by examiner

ADJUSTABLE PIVOT JOINT FOR VEHICLE SUSPENSIONS

FIELD OF THE INVENTION

The present invention relates to vehicle suspension systems generally, and more particularly to a pivot joint for adjusting one or more of wheel camber and wheel caster in a vehicle suspension.

BACKGROUND OF THE INVENTION

Typical vehicle suspensions mount a wheel to a spindle or steering knuckle. The spindle or steering knuckle includes support arms or extensions or portions for the reception of upper and lower pivot joint assemblies, which, in some cases comprise what are commonly referred to as ball joints. A ball joint is a ball and socket connection, with a ball stud extending from the ball portion of the ball joint.

Ball joints have been used in vehicular suspensions to provide rotational pivot joints between two structures within the suspension. In some arrangements, pivot joints, such as ball joints, may be used to pivotally connect an upper control arm to the steering knuckle, and/or to connect a lower control arm to the steering knuckle. A typical ball joint includes a shaft having a partial sphere formed at one end for pivotal reception in a cavity formed by a housing or ball cup of the joint. The other end of the shaft is typically received through an aperture in the suspension member, such as the steering knuckle, and secured thereto by threading a nut onto a threaded end of the shaft.

An axle arm assembly, such as an I-beam axle arm assembly, includes a first or inner end anchored to the frame of the vehicle, and a second or outer end supported by a coil spring and radius arm. The second end is further engaged to the wheel by the upper and lower ball joint assemblies. An upper portion of the second end of the axle arm assembly engages the shaft of the upper ball joint. By manipulating the orientation of the upper control arm relative to the shaft of the upper ball joint, certain positions of the wheel relative to the frame of the vehicle may be adjusted. These certain positions are wheel camber and wheel caster.

Upper and lower steering pivot points, such as upper and lower ball joints, help define a caster angle. The upper and lower steering pivot points can be, for example: (1) the upper and lower ball joints of a wishbone suspension design with upper and lower control arms; (2) the upper and lower ball joints of an A-arm suspension design; or (3) the lower ball joint and the strut tower mount of a McPherson strut design.

The caster or caster angle is the slope of a straight line running through the upper and lower steering pivot points relative to a vertical line running perpendicular to the ground and through the center point of the wheel, when viewed from the side of the vehicle. Caster is a backward or forward tilt at the top of the wheel assembly. A backward tilting is referred to as positive caster. A forward tilting is referred to as negative caster. Caster is a directional control angle or steering angle, not a tire wearing angle. Proper adjustment of the caster angle helps the front wheels maintain a straight ahead position or return to a straight ahead position out of a turn. Positive caster (a tilting back) places the point of load ahead of the wheel contact. Depending upon the vehicle, either positive or negative caster may be desired.

Camber is a tire-wearing angle. Camber, like caster, is a directional control angle. The camber or camber angle is the tilting of a front wheel relative to the vertical when viewed from the front of the vehicle. More specifically, camber is the inward or outward tilt of the wheel at the top relative to the ground or true vertical. Positive camber is the angle of the outward tilt relative to true vertical. Negative camber is the angle of the inward tilt relative to true vertical. By properly adjusting the camber angle, the road contact of the tire is brought more nearly under the point of load, and steering is made easier by allowing the weight of the vehicle to be carried by the inner wheel bearing and spindle.

In some circumstances, there may be a desire to adjust wheel alignment characteristics such as camber and caster. The pivot joints of the present invention may allow for such adjustment in situ without the need for complete replacement of the joint or modifications to the steering knuckle and/or other suspension members such as the control arms.

SUMMARY OF THE INVENTION

By means of the present invention, wheel alignment in relation to a vehicle suspension may be accomplished without removing and replacing parts, and without structural modification to suspension equipment. The wheel alignment adjustability is facilitated by a pivot joint that is connectable between mutually displaceable suspension members, such as a steering knuckle and a control arm. The pivot joint utilizes an internal guide structure that controls relative movement of two engaged components of the pivot joint, which relative movement correspondingly adjusts a spatial relationship between the connected suspension members. The internal guide structure eliminates the need for external cam structures and braces that have heretofore been used to adjust orientation relationships in pivot joints, such as vehicle ball joints.

In one embodiment, a pivot joint includes a housing having a cavity and a first guide structure, and a shaft pivotally receivable in the cavity. The pivot joint further includes a cap having a second guide structure that is cooperatively engageable with the first guide structure. A coupling device of the pivot joint secures the housing and the cap to the first suspension member at a receptacle of the first suspension member. The receptacle defines a central axis that passes through a stationary point of one of the housing and the cap when secured to the first suspension member. The coupling device is positionable through the receptacle to secure the housing and the cap to the first suspension member. Relative rotation of the cap and housing about one or more axes parallel to the central axis causes translational movement of the housing along one or more translation directions that are substantially perpendicular to the central axis.

The shaft of the pivot joint may include a partially spherical end region that is configured to be retainably and pivotally securable in the cavity of the housing. This shaft configuration is commonly used in ball joints.

The first guide structure may be one of a protrusion and a slot, and the second guide structure may be the other of the protrusion and the slot. The protrusion may be configured to be slidably engageable within the slot along a slot axis to cooperatively control the movement of the housing along the one or more translation directions.

The couping device may include a coupling member secured to the housing and extending from the housing away from the shaft when the shaft is pivotally received in the cavity.

The cap may include an elongated retention opening that is configured to receive the coupling member therein. The coupling member may be configured for sliding engagement with the retention opening along a translation axis of the retention opening defining the one or more translation directions.

An engagement member may be provided for engagement with the coupling member to secure the cap and the housing to the first suspension member at the receptacle. The engagement member may be threadably engageable with the coupling member.

In some embodiments, the translation axis may be substantially perpendicular to the slot axis.

The cap of the pivot joint may include a top ring and a boss extending from the top ring, wherein the boss includes a perimeter wall that is configured to be receivable in the receptacle of the first suspension member to limit motion of the cap to rotational motion about the central axis. The elongated retention opening may extend through the top ring and the boss, and the top ring may form a polygon.

A method for adjusting a wheel alignment in relation to a vehicle suspension includes securing a pivot joint between a first suspension member and a second suspension member of the vehicle suspension to connect the first suspension member to the second suspension member. The pivot joint includes a housing having a cavity and a first guide structure. A shaft of the pivot joint includes a partially spherical end region that is configured to be retainably and pivotally securable in the cavity of the housing. The shaft has a second end opposite from the partially spherical end, wherein the housing is securable to the first suspension member and the second end of the shaft is securable to the second suspension member. The pivot joint further includes a cap having a second guide structure that is cooperatively engageable with the first guide structure. A coupling device of the pivot joint secures the housing and the cap to the first suspension member, such that the second guide structure engages with the first guide structure. The housing is rotated relative to the cap to translationally move the housing and the shaft retained in the cavity thereof relative to the cap, thereby adjusting at least one of wheel camber and wheel caster.

The translational movement of the housing and the shaft retained in the cavity thereof relative to the cap may be along a translation axis defined by a retention opening in the cap. Rotation of the housing relative to the cap may move the coupling device along the translation axis within the retention opening. The first and second guide structures may cooperate to convert rotational movement of the housing to the translational movement along the translation axis.

In some embodiments, the first guide structure is one of a protrusion and a slot, and the second guide structure is the other of the protrusion and the slot, wherein the protrusion is configured to be slidably engageable within the slot along a slot axis to cooperatively control the movement of the housing along the translation axis.

In some embodiments, the pivot joint may be secured to a receptacle of the first suspension member, wherein the receptacle defines a central axis that passes through a stationary point of one of the housing and the cap when secured to the first suspension member. A rotational orientation of the cap about the central axis may control the adjustability of wheel camber and wheel caster upon rotation of the housing relative to the cap.

In some embodiments, the first suspension member is a control arm, and the second suspension member is a steering knuckle.

DETAILED DESCRIPTION OF THE INVENTION

The objects and features enumerated above, together with other objects, features, and advances represented by the present invention will now be presented in terms of detailed embodiments described with reference to the attached drawing figures. Other aspects of the invention are recognized as being within the grasp of those having ordinary skill in the art.

For the purposes hereof, spatial relationship terms such as "up", "down", "top", "bottom", "above", "below", "lower", and the like are intended to be construed with reference to the attached drawing figures, and are not intended to be limited to any particular gravitational or other orientation reference.

Figure 1:
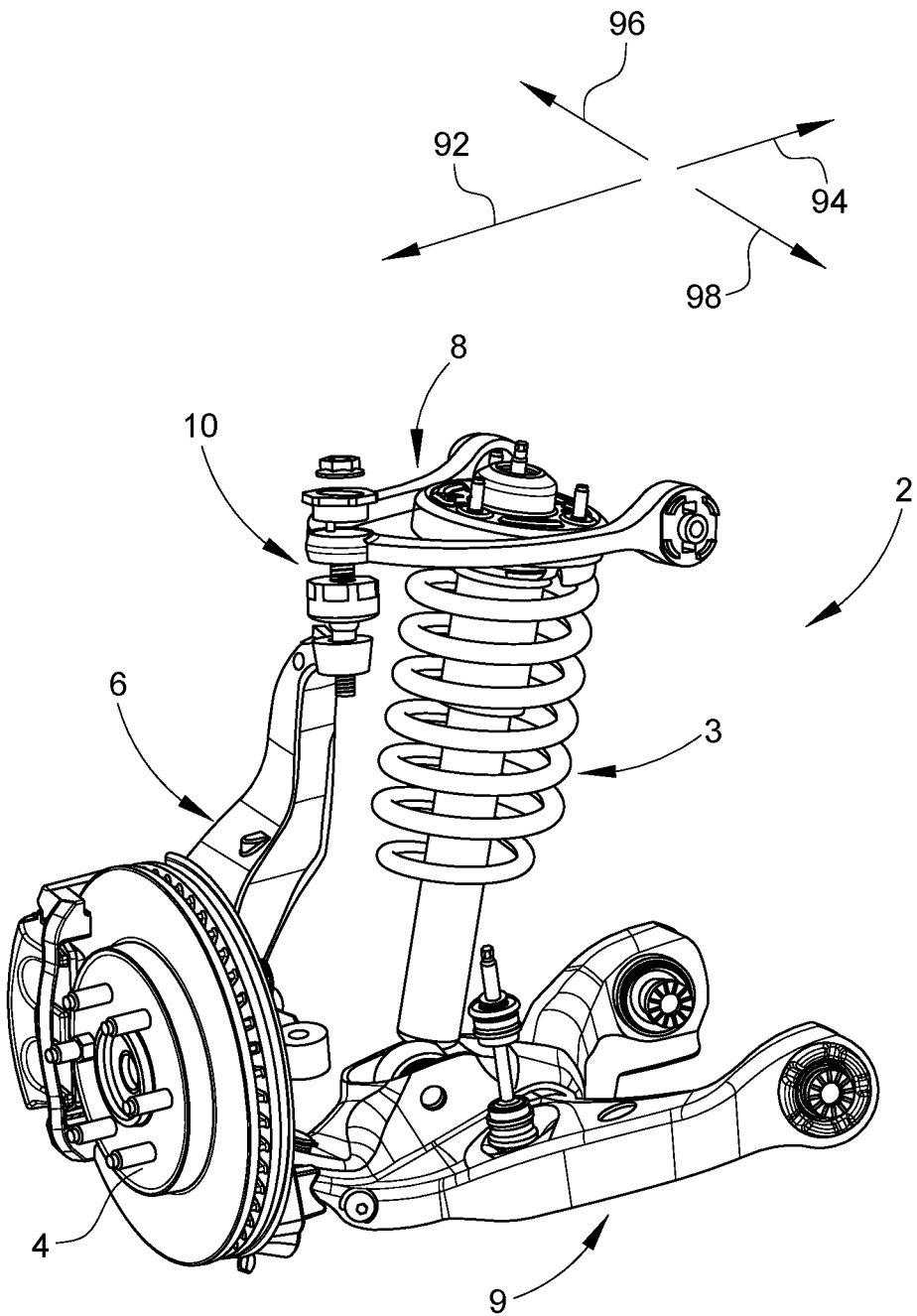
FIG. 1 is a schematic illustration of a vehicle suspension incorporating a pivot joint of the present invention.

A portion of a vehicle suspension 2 is illustrated in FIG. 1, with a wheel hub 4 being connected to a steering knuckle 6 that is itself supported by and between an upper control arm 8 and a lower control arm 9. A strut assembly 3 also connects between upper and lower control arms 8, 9. A pivot joint 10 is illustrated in FIG. 1 in an exploded view for pivotally connecting upper control arm 8 to steering knuckle 6. In this embodiment, therefore, upper control arm 8 may constitute a "first suspension member", and steering knuckle 6 may constitute a "second suspension member". It is contemplated, however, that other components of vehicle suspensions may be coupled with pivot joint 10. One example alternative set of suspension components linkable through pivot joint 10 include lower control arm 9 and steering knuckle 6.

Figure 2:
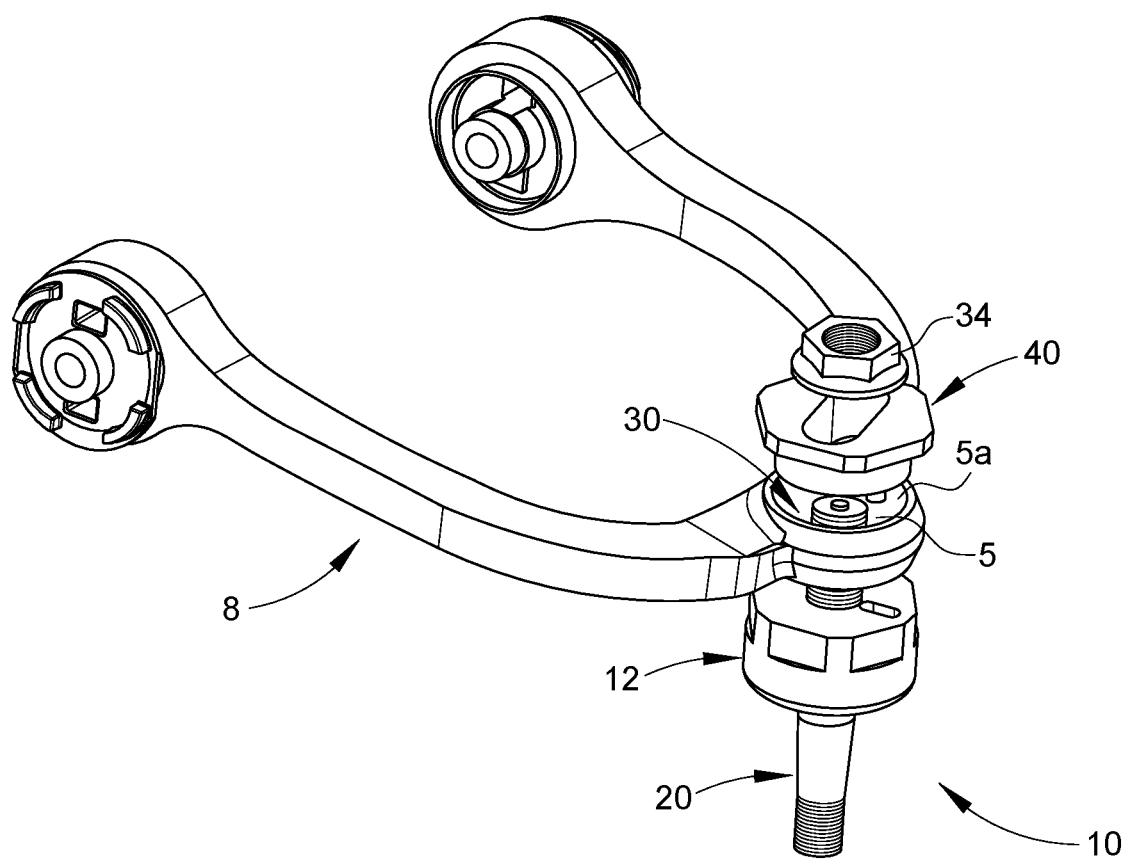
FIG. 2 is a schematic illustration of a pivot joint of the present invention arranged for securement to a portion of a vehicle suspension.
Figure 3:
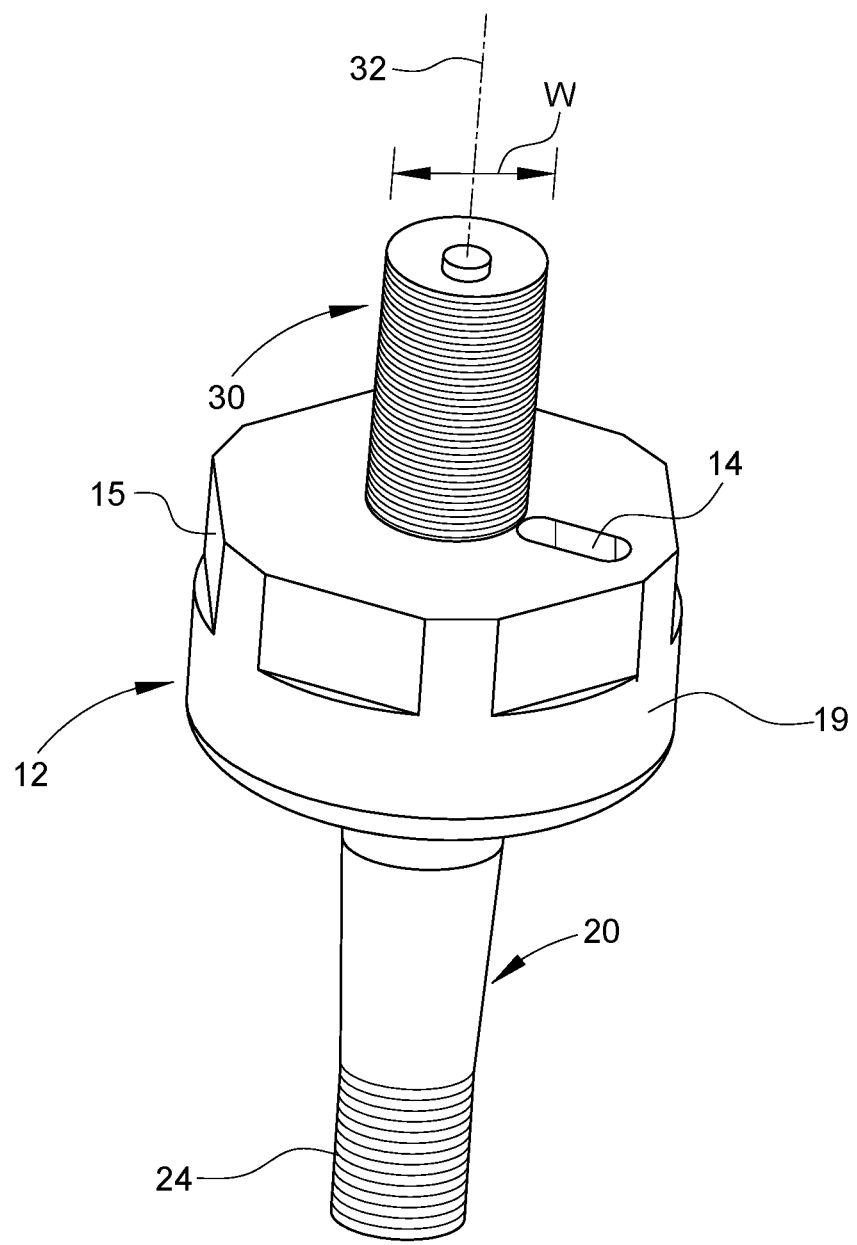
FIG. 3 is a perspective view of a pivot joint of the present invention.

FIG. 2 illustrates pivot joint 10 in an exploded view in combination with upper control arm 8. Pivot joint 10 may include a "ball and socket" arrangement in order to permit restricted relative movement between upper control arm 8 and steering knuckle 6. In some embodiments, pivot joint 10 may be used in place of a conventional ball joint to secure upper control arm 8 to steering knuckle 6. In addition to the relative movement afforded by the ball and socket arrangement, pivot joint 10 further facilitates wheel alignment adjustment in relationship to suspension 2 without requiring disassembly of pivot joint 10. Instead, such wheel alignment adjustments may be accomplished in situ by simply performing rotational manipulation to pivot joint 10.

Pivot joint 10 may be secured to upper control arm 8 at a receptacle 5 thereof, as will be described in greater detail hereinbelow. Receptacle 5 may be conventionally used for connection to a standard ball joint. Receptacle 5 may be variously configured depending upon the type and model of the suspension member, such that pivot joint may be appropriately designed to connect to the respective suspension members as needed.

Figure 6:
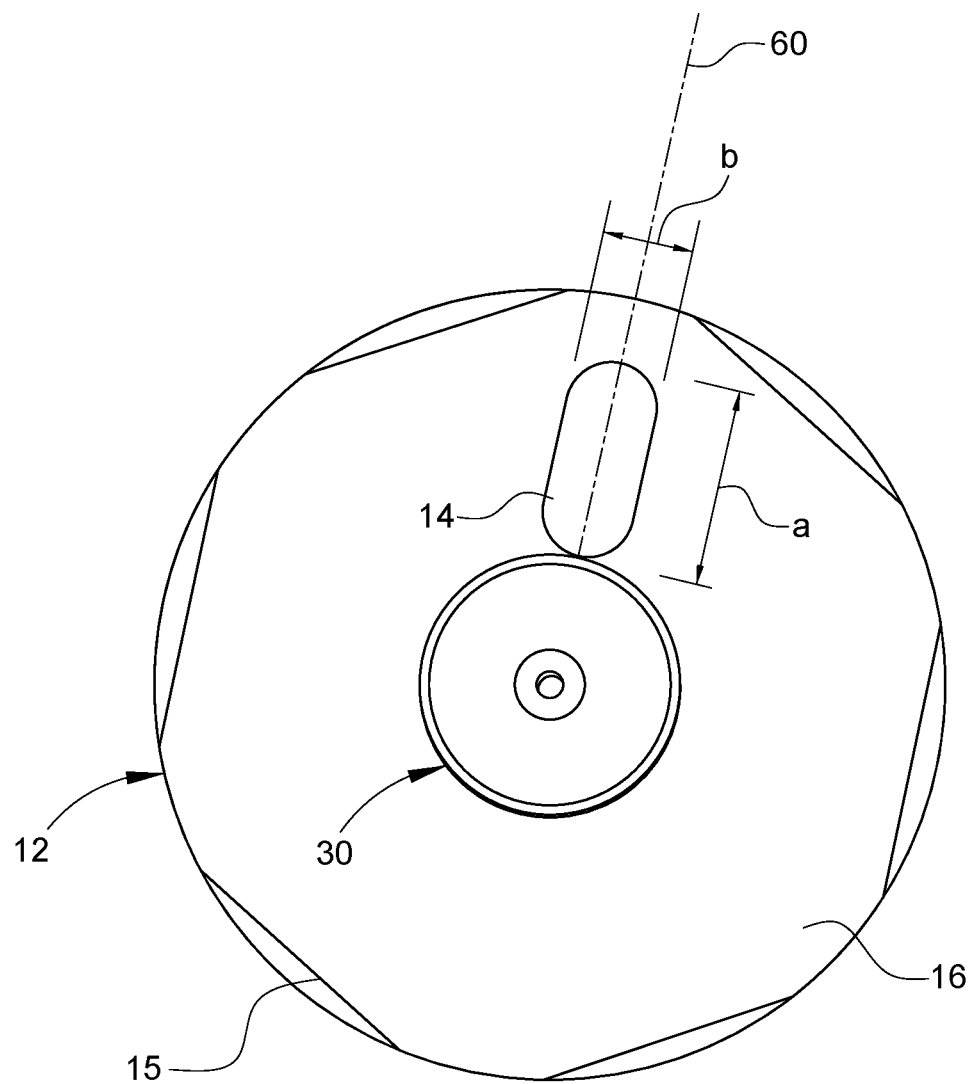
FIG. 6 is a top plan view of a portion of a pivot joint of the present invention.
Figure 7:
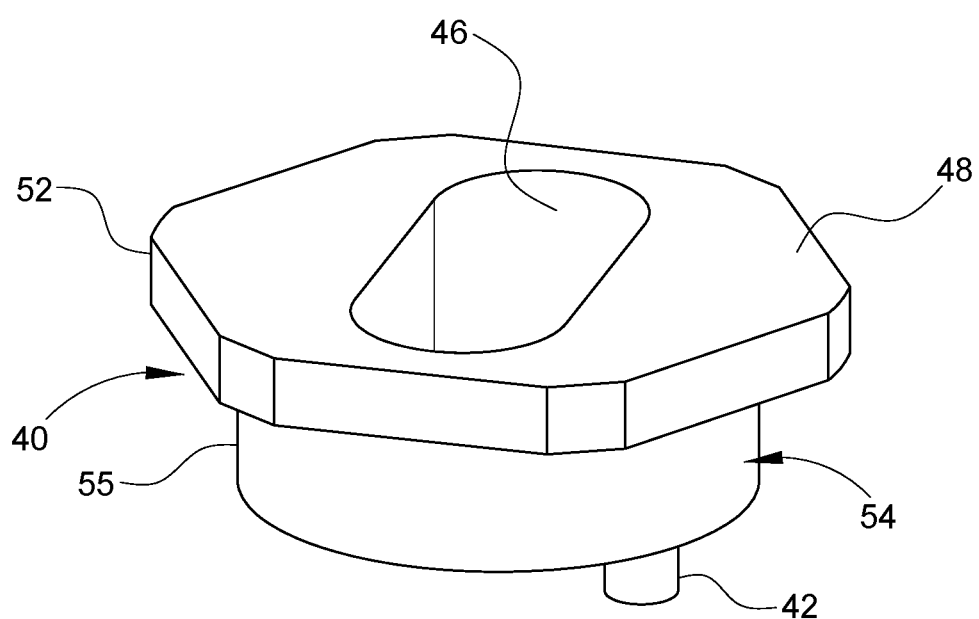
FIG. 7 is a perspective view of a portion of a pivot joint of the present invention.
Figure 8:
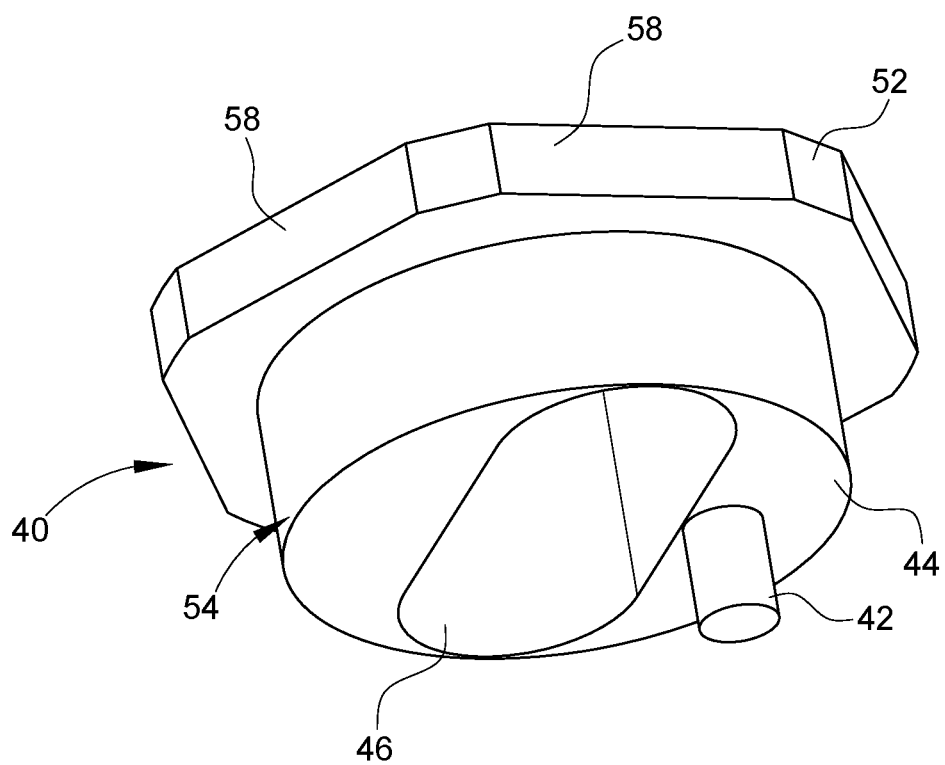
FIG. 8 is a perspective view of a portion of a pivot joint of the present invention.

Pivot joint 10 includes a housing 12 having a first guide structure 14 at a first surface 16. In the illustrated embodiment, first guide structure 14 includes a slot in first surface 16. However, it is to be understood that first guide structure 14 may be provided in a number of different configurations suitable for the functionality described herein. Slot 14 defines a slot axis 60, as illustrated in the top view of housing 12 depicted in FIG. 6. Slot axis 60 extends centrally through a long dimension "a" of slot 14. In the illustrated embodiment, slot axis 60 extends radially from an origin axis 32 of housing 12. Other arrangements and orientations for slot 14, however, are contemplated as being useful in the present invention.

Figure 4:
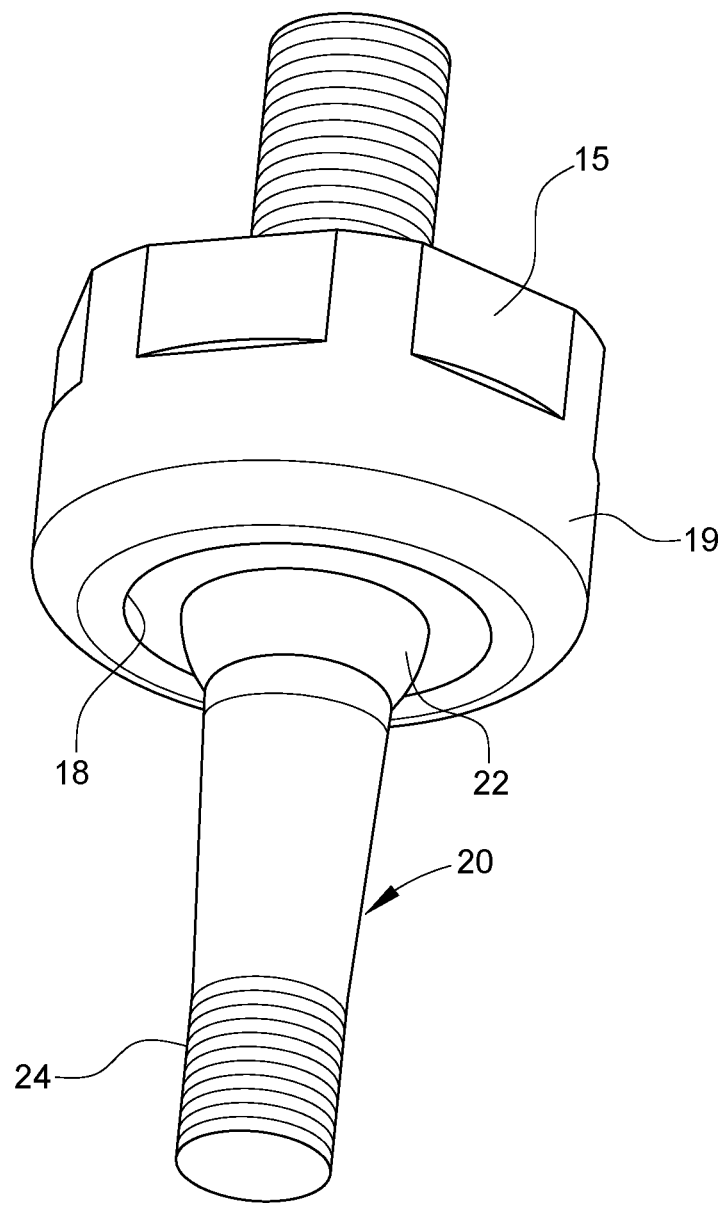
FIG. 4 is a perspective view of a pivot joint of the present invention.
Figure 5:
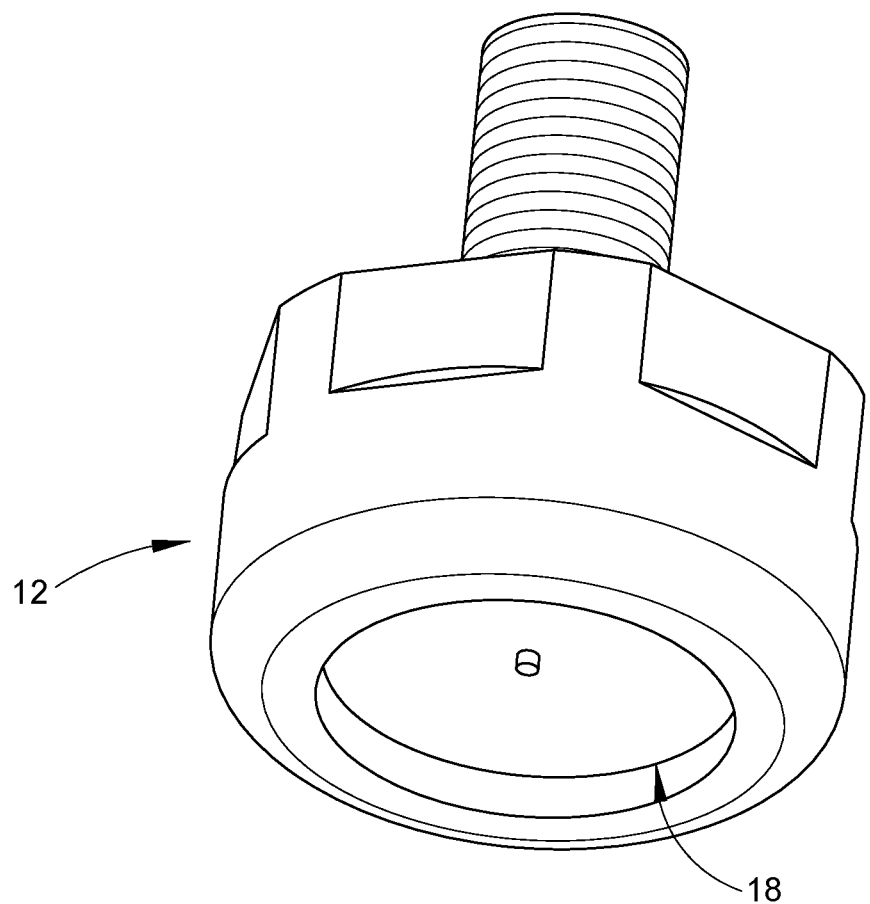
FIG. 5 is a perspective view of a portion of a pivot joint of the present invention.

A shaft 20 is illustrated as being pivotally secured to housing 12. FIG. 4 illustrates shaft 20 being pivotally receivable in a cavity 18 of housing 12. In the illustrated embodiment, cavity 18 is disposed in a second surface 17 of housing 12 that is opposite from first surface 16. It is contemplated, however, that housing 12 may be variously configured, with a primary functional aspect including establishing cavity 18 for shaft 20.

In some embodiments, shaft 20 includes a partially spherical end region 22 that is configured to be retainably and pivotally securable in cavity 18 of housing 12. This arrangement is analogous to conventional ball and socket joints, wherein cavity 18 is shaped to receive a partially spherical "ball" portion of shaft 20 so that the partially spherical end portion 22 may pivot within cavity 18. End portion 22 may be retained in cavity 18 in a conventional manner, such as with a securement ring (not shown) or other retention structure.

Shaft 20 includes a second end portion 24 that is opposite from first end portion 22. Second end portion 24 may be securable to the second suspension member, such as steering knuckle 6 in order to secure pivot joint 10 between the first and second suspension members of suspension 2. For the purposes hereof, the term "secure between" is intended to mean that pivot joint 10 connects the first suspension member to the second suspension member, or vice versa, so that the suspension members are pivotally connected to one another via pivot joint 10. FIG. 1 illustrates second end portion 24 of shaft 20 being operably received through an aperture in steering knuckle 6. Second end portion 24 of shaft 20 may be threaded so as to threadably receive a nut to secure second end portion 24 at the second suspension member, such as steering knuckle 6.

Housing 12 may be configured to facilitate rotational manipulation with a tool. In the illustrated embodiment, housing 12 includes a circumferential surface 19 with planar regions 15 that are configured to coordinate with a wrench or other tool to aid in rotating housing 12.

A cap 40 includes a second guide structure 42 that is cooperatively engageable with first guide structure 14. In the illustrated embodiment, second guide structure 42 is a protrusion extending from a lower surface 44 of cap 40, wherein the protrusion 42 is configured to be engageable with slot 14. In some embodiments, protrusion 42 is configured to be slidably engageable within slot 14. For instance, protrusion 42 may have a dimension "d", such as a diameter "d" that is slightly smaller than a short or width dimension "b" of slot 14 so that protrusion 42 is receivable in slot 14. Preferably, however, dimension "d" of protrusion 42 is large enough to minimize "play" in the engagement between protrusion 42 and slot 14 in directions other than along slot axis 60. For the purposes hereof, the term "slidably" is intended to mean an engagement that permits movement of a moveable component in relation to a non-moving component along a defined path, and restricted from significant movement deviating from the defined path while the components are engaged.

It is to be understood that a variety of configurations for first and second guide structures are contemplated as being useful in the present invention, and that the illustrated combination of a protrusion and a slot is merely exemplary of the myriad possible structural configurations. In preferred embodiments, the first and second guide structures 14, 42 are configured to be slidably engageable with one another along a defined path. In some embodiments, the defined path is linear, such as in slot axis 60. It is also to be understood that the protrusion and slot of first and second guide structures 14, 42 are interchangeable, wherein first guide structure 14 may be one of a protrusion and a slot, and second guide structure 42 may be the other of the protrusion and the slot.

A coupling device 30 of pivot joint 10 is configured for securing housing 12 and cap 40 to first suspension member 8, and in some embodiments for securing housing 12 and cap 40 to first suspension member 8 at receptacle 5. Coupling device 30 may be positionable through receptacle 5 to secure housing 12 and cap 40 to first suspension member 8. In the illustrated embodiment, coupling device 30 includes a coupling member 32 and an engagement member 34 that together secure housing 12 and cap 40 to first suspension member 8.

In some embodiments, cap 40 includes a retention opening 46. The illustrated embodiment of cap 40 includes retention opening 46 in lower surface 44. Retention opening 46 may be configured to receive coupling member 32 therein. In some embodiments, retention opening 46 is a through-hole through cap 40 from lower surface 44 to upper surface 48. Coupling member 32 may therefore extend through retention opening 46 for retainable engagement therein by connecting to engagement member 34. In some embodiments, engagement member 34 may be threadably engaged with a threaded portion of coupling member 32 so as to brace against upper surface 48 of cap 40 to secure coupling member within retention opening 46 and to secure cap 40 to housing 12.

Retention opening 46 may be elongated such that a translation dimension "t" of retention opening 46 along a translation axis 50 is greater than a transverse dimension "x" of retention opening 46. In some embodiments, a width or diameter dimension "w" of coupling member 32 is slightly smaller than transverse dimension "x" of retention opening 46, such that coupling member 32 is configured for sliding engagement within retention opening 46 along translation axis 50.

In the illustrated embodiment, cap 40 includes a top ring 52 and a boss 54 extending from top ring 52. Boss 54 may preferably have a perimeter wall 55 that is configured to be receivable in receptacle 5 of first suspension member 8 in a manner to limit motion of cap 40 to rotational motion about a central axis 7 of receptacle 5. For example, perimeter wall 55 may be configured to be complimentary to a receptacle wall 5a defining at least a portion of receptacle 5 in which boss 54 may be received. In one embodiment, perimeter wall may be substantially cylindrical with a boss diameter "z" that is similar to, but slightly less than an inner diameter of receptacle wall 5a defining a cylindrical receptacle 5. Other shapes for perimeter wall 55 and receptacle wall 5a, however, are contemplated as being useful in the present invention.

Cap 40 is receivable in receptacle 5 in a manner that permits rotation of cap 40 about central axis 7. Accordingly, central axis 7 passes through a radially stationary point of cap 40 when cap 40 is secured in receptacle 5. For the purposes hereof, the term "radially stationary point" is intended to mean a point on an article that does not deviate from its position relative to an axis when the article is rotated about that axis.

Figure 9:
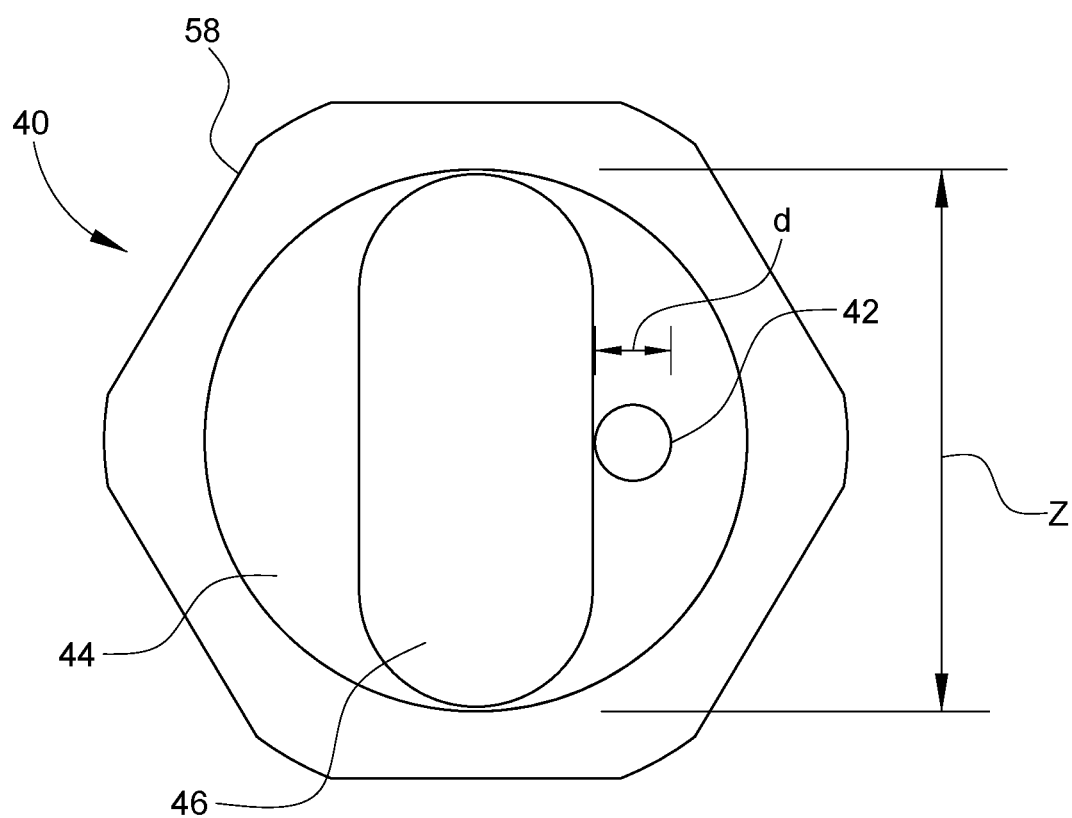
FIG. 9 is a bottom plan view of a portion of a pivot joint of the present invention.
Figure 10:
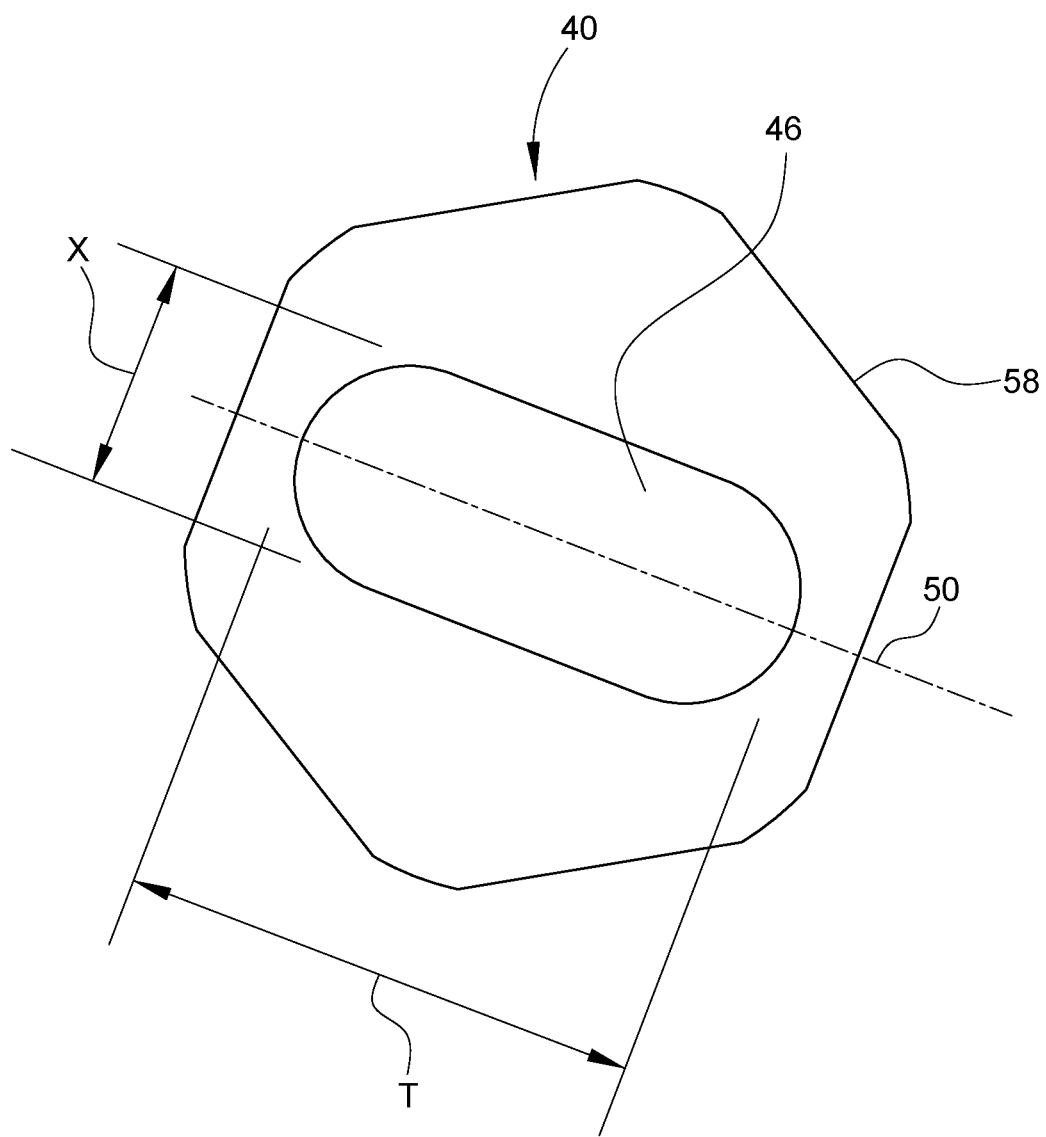
FIG. 10 is a top plan view of a portion of a pivot joint of the present invention.

Certain manipulations of pivot joint 10 may, as described herein, involve rotation of cap 40 about an axis, such as central axis 7. To assist in rotating cap, top ring 52 may include one or more planar regions 58 that may be easily grasped by a tool such as a wrench or plyers. In some embodiments, a plurality of planar regions 58 may together form a polygonal shape, such as a hexagon. FIGS. 9 and 10 illustrate such a polygonal shape for top ring 52 of cap 40.

In some embodiments, coupling member 32 is secured to housing 12 and extends from first surface 16 away from shaft 20 when shaft 20 is pivotally received in cavity 18. Coupling member may be threadably engaged with housing 12, integrally formed with housing 12, or otherwise secured to housing 12. In some embodiments, coupling member 32 extends from first surface 16 of housing 12 along central axis 5.

Figure 11:
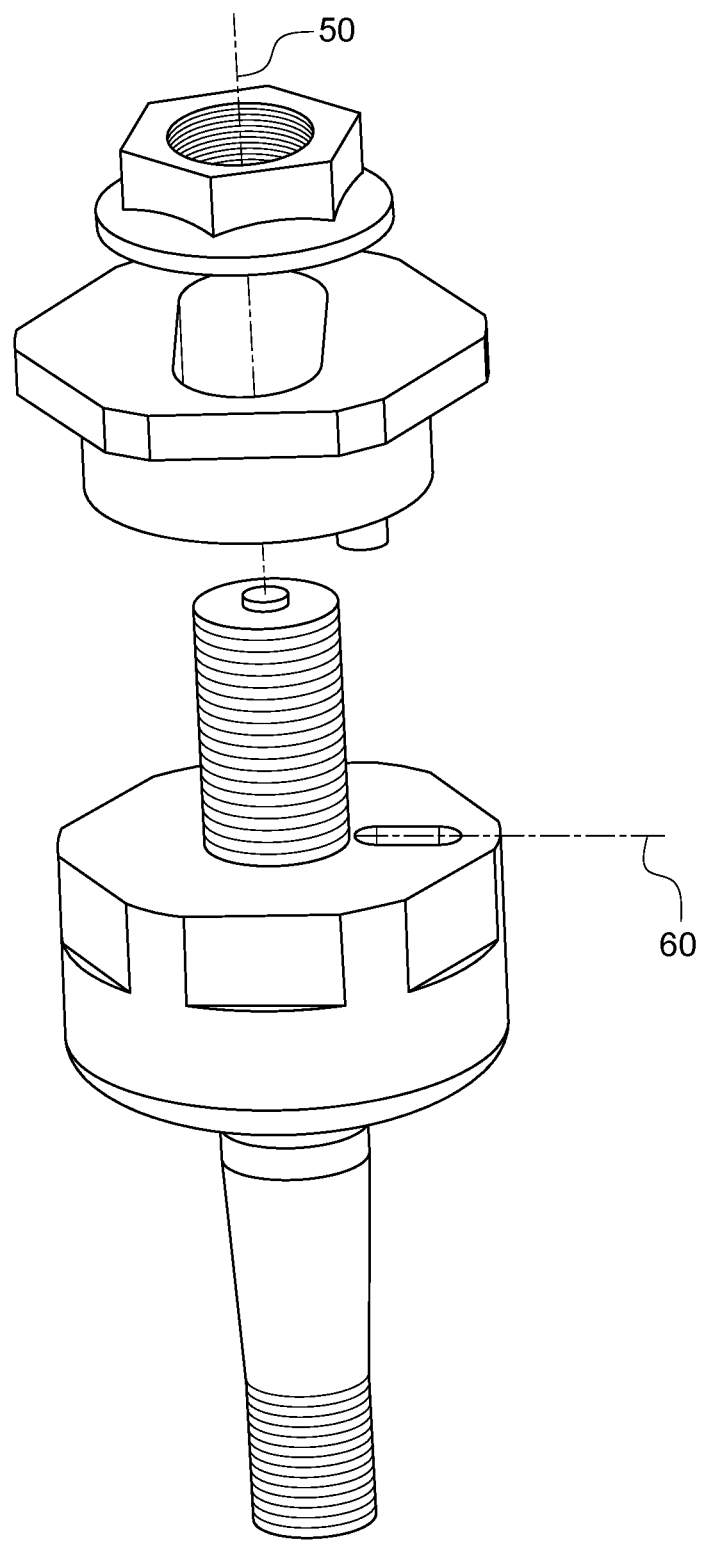
FIG. 11 is an exploded perspective view of a pivot joint of the present invention.

As shown in the exploded isolation view of pivot joint 10 in FIG. 11, an embodiment of pivot joint 10 orients translation axis 50 of retention opening 46 in angular relationship with slot axis 60 of first guide structure 14. Relative rotation of housing 12 and cap while first and second guide structures are engaged results in an adjustment of the angular relationship of translation axis 50 and slot axis 60.

Figure 12A:
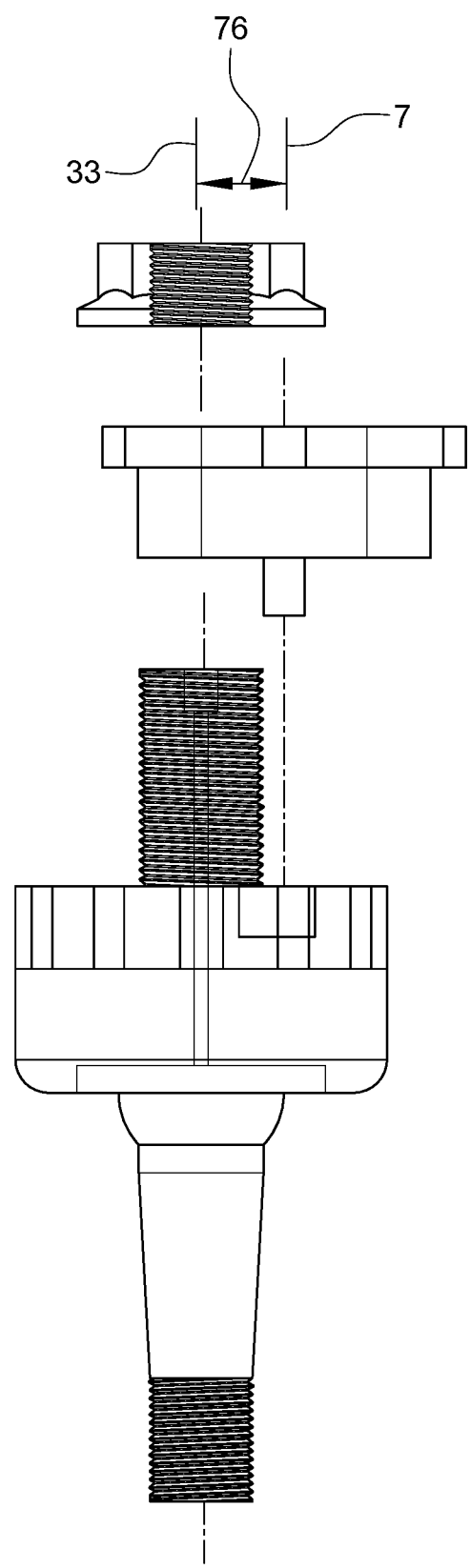
FIG. 12A is an exploded side view of a pivot joint of the present invention in a first adjustment condition.
Figure 12B:
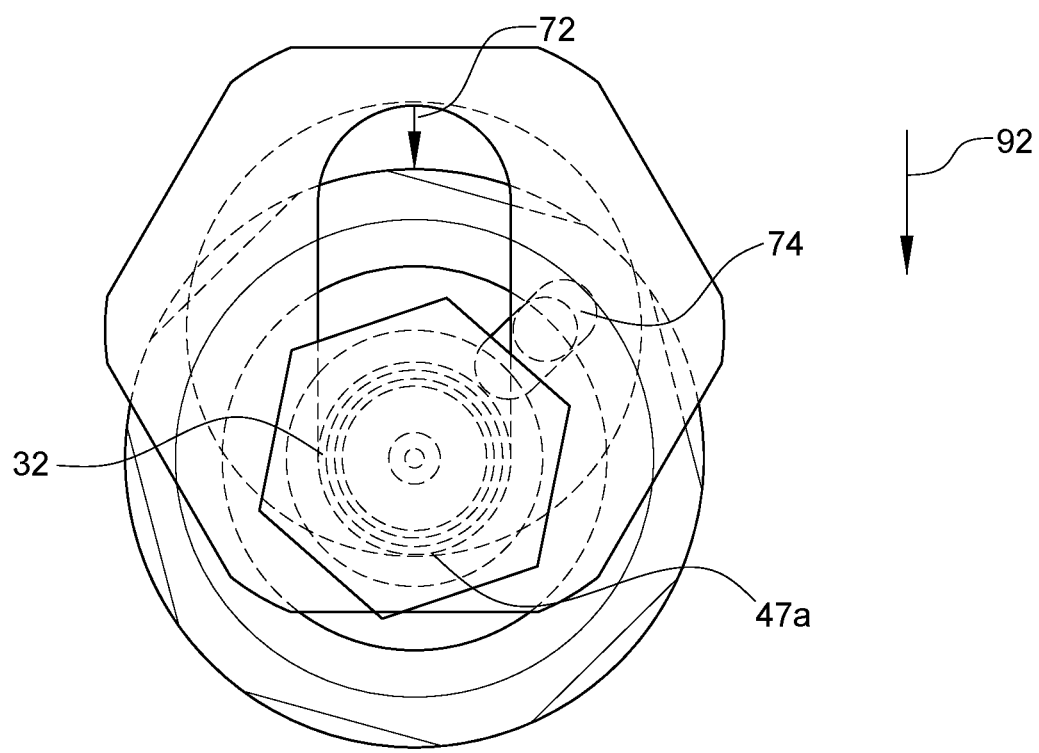
FIG. 12B is a partial phantom view of the pivot joint illustrated in FIG. 12A in the first adjustment condition.

Relative rotation of housing 12 and cap 40 while first and second guide structures are engaged drives an adjustment of the positioning of shaft 20 relative to central axis 7. The adjustment of such positioning correspondingly adjusts wheel alignment characteristics including wheel camber and wheel caster. FIGS. 12A-14B illustrate an example embodiment of pivot joint 10 in various adjustment conditions represented by various extents of relative rotation among housing 12 and cap 40 while first and second guide structures 14, 42 are mutually engaged. FIG. 12A is an exploded view and FIG. 12B is a top phantom view of a pivot joint in a first adjustment condition wherein housing 12 is rotated relative to cap 40 to a maximum extent in a first direction wherein coupling member 32 abuts first end 47a of retention opening 46. In this first adjustment condition, shaft 20 is moved with housing 12 in a first translation direction 72 parallel to translation axis 50 and substantially perpendicular to central axis 7. In some embodiments, rotation of housing 12 relative to cap 40 is controlled about a plurality of axes through the engagement of first and second guide structures 14, 42. As shown in FIG. 12B, first guide structure 14 of housing 12 is rotated to a first position 74 while guiding second guide structure 42. The sliding engagement of second guide structure 42 in first guide structure 14, along with the sliding engagement of coupling member 32 in retention opening 46 creates the plurality of rotational axes along translation axis 50, such that translational movement of housing 12 and shaft 20 slidably engaged in retention opening 46 is along translation axis 50. First and second guide structures 14, 42, as well as coupling member 32 in retention opening 46 therefore cooperate to convert rotational movement of housing 12 to translational movement along translation axis 50.

In an orientation in which an outside of the vehicle is a direction 92 from pivot joint wherein direction 92 is parallel to first direction 72, movement of housing 12 toward first end 47a of retention opening 46 increases negative camber of the wheel associated with vehicle suspension 2. Alternatively, if first direction 72 is parallel to direction 98 as shown in FIG. 1, movement of housing 12 toward first end 47a of retention opening 46 increases positive caster of the wheel associated with vehicle suspension 2.

FIG. 12A illustrates an extent of wheel alignment adjustment afforded by relative rotation of housing 12 with respect to cap 40. FIG. 12A is a side exploded view of pivot joint in the first adjustment condition wherein a coupling member axis 33 is offset from central axis 7 by a first condition offset 76.

Figure 13A:
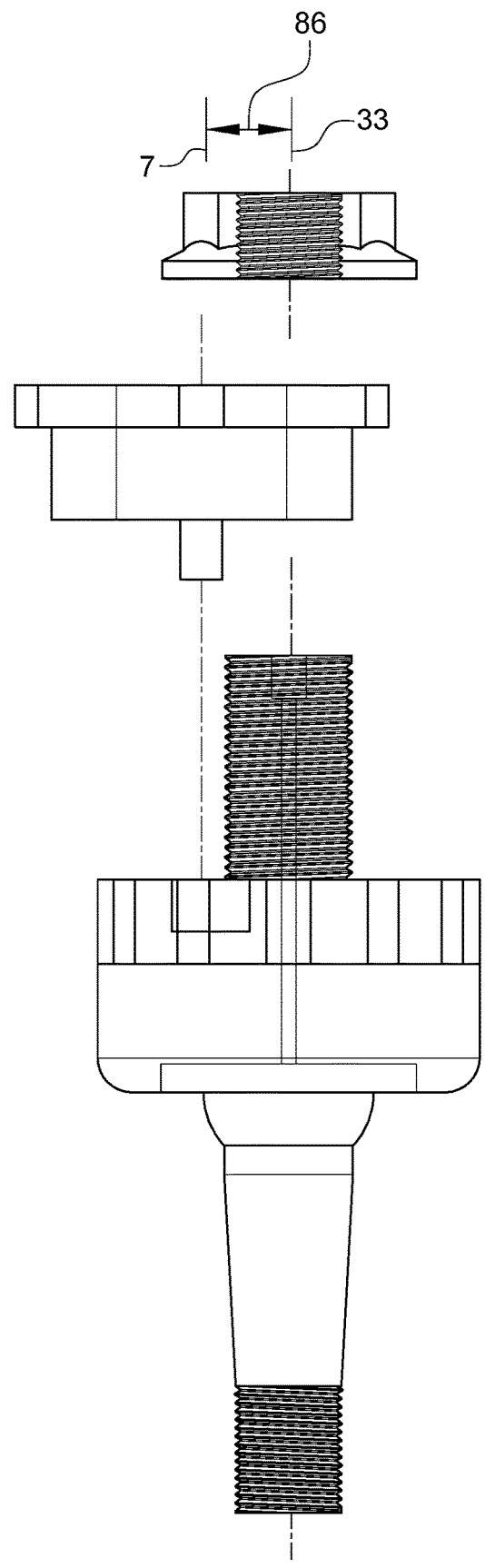
FIG. 13A is an exploded side view of a pivot joint of the present invention in a second adjustment condition.
Figure 13B:
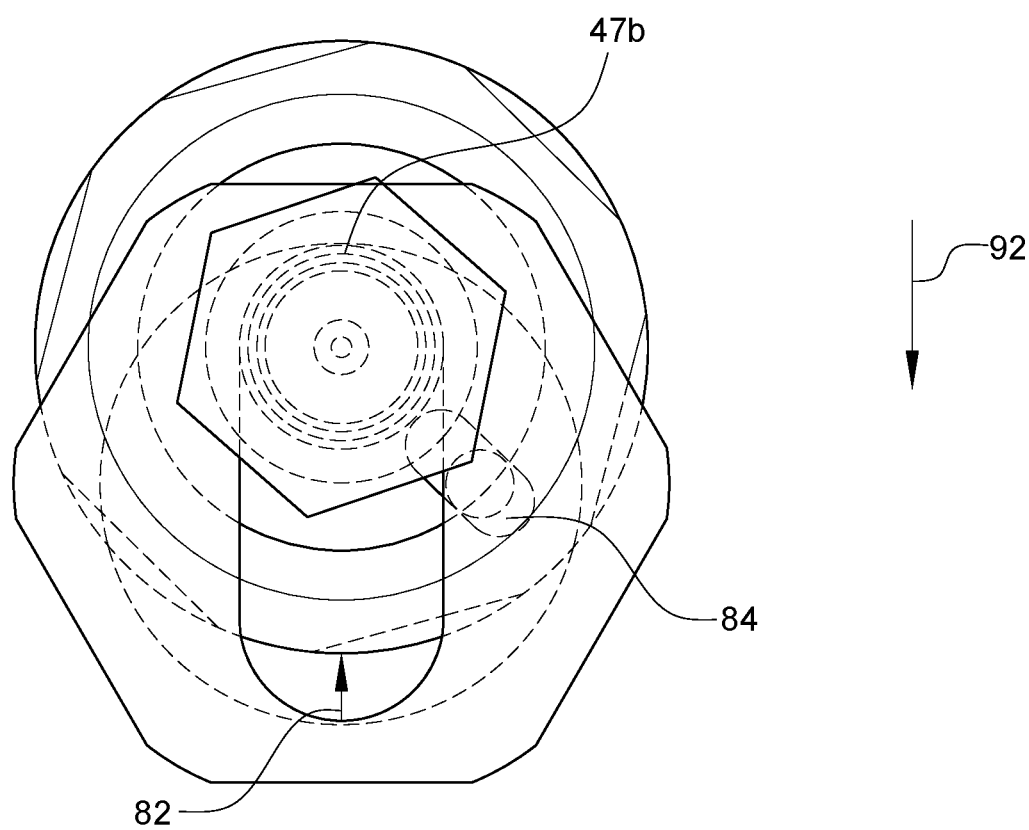
FIG. 13B is a partial phantom view of the pivot joint illustrated in FIG. 13A in the second adjustment condition.

FIGS. 13A and 13B illustrate pivot joint 10 in a second adjustment condition wherein housing 12 is rotated relative to cap 40 to a maximum extent in a second direction wherein coupling member 32 abuts second end 47b of retention opening 46. In this second adjustment condition, shaft 20 is moved with housing 12 in a second translation direction 82 parallel to translation axis 50 and substantially perpendicular to central axis 7. In some embodiments, rotation of housing 12 relative to cap 40 is controlled about a plurality of axes through the engagement of first and second guide structures 14, 42, as described above. As shown in FIG. 13B, first guide structure 14 of housing 12 is rotated to a second position 84 while guiding second guide structure 42.

In an orientation in which an outside of the vehicle is a direction from pivot joint 10, wherein direction 92 is parallel to but opposite from second direction 82, movement of housing 12 toward second end 47b of retention opening 46 increases positive camber of the wheel associated with vehicle suspension 2.

FIG. 13A illustrates an extent of wheel alignment adjustment afforded by relative rotation of housing 12 with respect to cap 40. FIG. 13A is a side exploded view of pivot joint 10 in the second adjustment condition wherein coupling member axis 33 is offset from central axis 7 by a second condition offset 86.

Figure 14A:
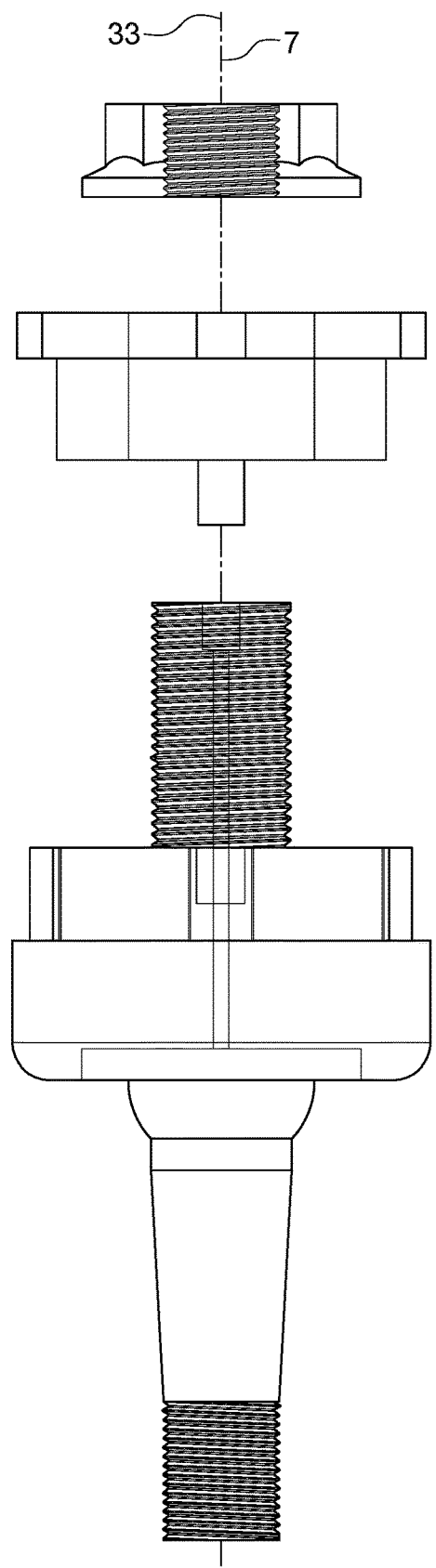
FIG. 14A is an exploded side view of a pivot joint of the present invention in a third adjustment condition.
Figure 14B:
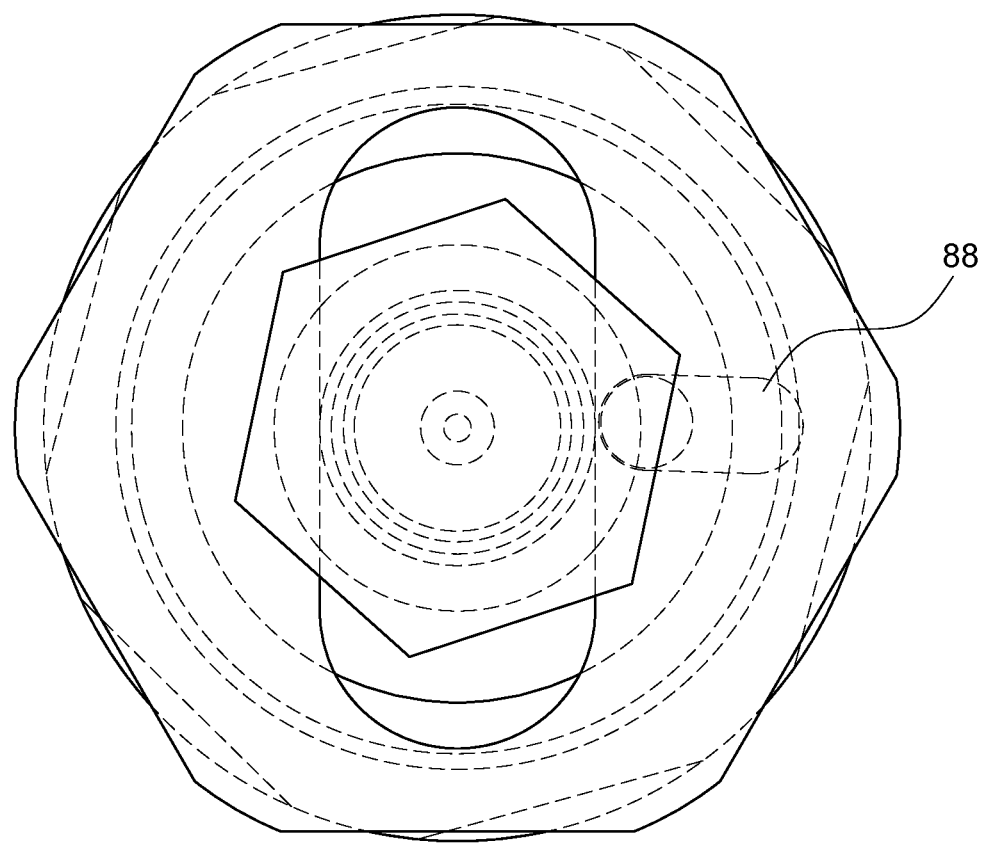
FIG. 14B is a partial phantom view of the pivot joint illustrated in FIG. 14A in the third adjustment condition.

FIGS. 14A and 14B illustrate pivot joint 10 in a third adjustment condition wherein housing 12 is positioned relative to cap 40 with coupling member 32 approximate a midpoint 47c of retention opening 46 along retention axis 50. The orientation of third adjustment condition results in a neutral setting for camber/caster. As shown in FIG. 14A, coupling member axis 33 is not offset from central axis 7. In this relative orientation of housing 12 and cap 40, first guide structure 14 of housing 12 is in a third, neutral position 88.

It should be understood that retention opening 46 may be variously oriented with respect to directions 92, 94, 96, 98, including orientations wherein retention axis 50 is aligned with zero or more of directions 92, 94, 96, 98. When retention axis 50 is not aligned with a direction 92, 94, 96, 98, relative rotation of housing 12 and cap 40 while first and second guide structures are mutually engaged results in adjustment of both camber and caster wheel alignment characteristics. For example, in some embodiments, when retention axis 50 is aligned at a 45° angle with respect to direction 92, relative rotation of housing 12 and cap 40 while first and second guide structures are mutually engaged may result in equal adjustment of wheel camber and wheel caster.

The invention has been described herein in considerable detail to provide those of ordinary skill in the art with the information needed to apply the novel principles and to construct and use embodiments of the invention as required. It is to be understood, however, that various modifications can be accomplished without departing from the invention itself.

The invention claimed is:

1. A pivot joint for connection between first and second suspension members in a vehicle suspension, the pivot joint comprising:
    a housing having a cavity and a first guide structure;
    a shaft pivotally receivable in the cavity;
    a cap having a second guide structure that is cooperatively engageable with the first guide structure;
    an elongated retention opening in one of the housing and the cap defining a translation axis;
    a coupling device for securing the housing and the cap to the first suspension member at a receptacle of the first suspension member, the receptacle defining a central axis that passes through a radially stationary point of one of the housing and the cap when secured to the first suspension member, wherein the coupling device is positionable through the receptacle to secure the housing and the cap to the first suspension member, and wherein relative rotation of the cap and housing about one or more axes parallel to the central axis causes translational movement of the housing along the translation axis that is substantially perpendicular to the central axis, wherein the translational movement is guided by the coupling device within the retention opening.

2. The pivot joint as in claim 1 wherein the shaft includes a partially spherical end region that is configured to be retainably and pivotally securable in the cavity of the housing.

3. The pivot joint as in claim 1 wherein the first guide structure is one of a protrusion and a slot, and the second guide structure is the other of the protrusion and the slot, wherein the protrusion is configured to be slidably engageable within the slot along a slot axis to cooperatively control the movement of the housing along the translation axis.

4. The pivot joint as in claim 3 wherein the coupling device includes a coupling member secured to the housing and extending from the housing away from the shaft when the shaft is pivotally received in the cavity.

5. The pivot joint as in claim 4, wherein the elongated retention opening is disposed in the cap, wherein the retention opening is configured to receive the coupling member therein.

6. The pivot joint as in claim 5 wherein the coupling member is configured for sliding engagement with the elongated retention opening along the translation axis of the retention opening defining one or more translation directions.

7. The pivot joint as in claim 6, including an engagement member for engagement with the coupling member to secure the cap and the housing to the first suspension member at the receptacle.

8. The pivot joint as in claim 7 wherein the engagement member is threadably engageable with the coupling member.

9. The pivot joint as in claim 6 wherein the translation axis is angled with respect to the slot axis.

10. The pivot joint as in claim 6 wherein the cap includes a top ring and a boss extending from the top ring, the boss having a perimeter wall that is configured to be receivable in the receptacle of the first suspension member to limit motion of the cap to rotational motion about the central axis.

11. The pivot joint as in claim 10 wherein the elongated retention opening extends through the top ring and the boss.

12. The pivot joint as in claim 10 wherein the top ring forms a polygon.

13. A method for adjusting a wheel alignment in relation to a vehicle suspension, the method comprising:
    (a) securing a pivot joint between a first suspension member and a second suspension member of the vehicle suspension, the pivot joint including:
        (i) a housing having a cavity and a first guide structure;
        (ii) a shaft having a partially spherical end region that is configured to be retainably and pivotally securable in the cavity of the housing, the shaft having a second end portion opposite from the partially spherical end, wherein the housing is securable to the first suspension member and the second end portion of the shaft is securable to the second suspension member;
        (iii) a cap having a second guide structure that is cooperatively engageable with the first guide structure;
        (iv) a coupling device for securing the housing and the cap to the first suspension member, such that the second guide structure engages with the first guide structure;
    (b) rotating the housing relative to the cap to translationally move the housing and the shaft retained in the cavity thereof relative to the cap along a translation axis defined by a retention opening in the cap, thereby adjusting at least one of wheel camber and wheel caster.

14. The method as in claim 13 wherein rotation of the housing relative to the cap moves the coupling device along the translation axis within the retention opening.

15. The method as in claim 14 wherein the first and second guide structures cooperate to convert rotational movement of the housing to the translational movement along the translation axis.

16. The method as in claim 15 wherein the first guide structure is one of a protrusion and a slot, and the second guide structure is the other of the protrusion and the slot, wherein the protrusion is configured to be slidably engageable within the slot along a slot axis to cooperatively control the movement of the housing along the translation axis.

17. The method as in claim 13 wherein the pivot joint is secured to a receptacle of the first suspension member, the receptacle defining a central axis that passes through a stationary point of one of the housing and the cap when secured to the first suspension member.

18. The method as in claim 17 wherein a rotational orientation of the cap about the central axis controls adjustability of wheel camber and wheel caster upon rotation of the housing relative to the cap.

19. The method as in claim 13 wherein the first suspension member is a control arm, and the second suspension member is a steering knuckle.

\* \* \* \* \*